United States Patent [19]
Ashihara et al.

[11] Patent Number: 5,883,739
[45] Date of Patent: Mar. 16, 1999

[54] INFORMATION DISPLAY DEVICE FOR VEHICLE

[75] Inventors: Jun Ashihara; Katsuki Ichinose; Tsuyoshi Hano; Katsuhiko Takebe, all of Saitama, Japan

[73] Assignee: Honda Giken Kogyo Kabushiki Kaisha, Tokyo, Japan

[21] Appl. No.: 650,590

[22] Filed: May 20, 1996

Related U.S. Application Data

[63] Continuation of Ser. No. 297,587, Aug. 29, 1994, abandoned.

[30] Foreign Application Priority Data

| Oct. 4, 1993 | [JP] | Japan | 5-280001 |
| Oct. 4, 1993 | [JP] | Japan | 5-280002 |
| Oct. 4, 1993 | [JP] | Japan | 5-280003 |
| Nov. 19, 1993 | [JP] | Japan | 5-338731 |
| Nov. 19, 1993 | [JP] | Japan | 5-338732 |
| Dec. 2, 1993 | [JP] | Japan | 5-342162 |

[51] Int. Cl.⁶ .......................... G02B 27/22; H04N 13/04; H04N 7/00; H04N 7/18
[52] U.S. Cl. .......................... 359/462; 348/118; 348/116; 348/54; 348/55
[58] Field of Search ..................... 359/462, 463, 359/464, 465, 466, 469, 48, 13; 348/51, 59, 42, 47, 55, 115, 118; 355/22; 345/7

[56] References Cited

U.S. PATENT DOCUMENTS

| 3,830,974 | 8/1974 | Dupouy | 348/725 |
| 4,315,240 | 2/1982 | Spooner | 345/7 |
| 4,573,191 | 2/1986 | Kidode et al. | 359/462 |
| 4,805,015 | 2/1989 | Copeland |  |
| 4,829,365 | 5/1989 | Eichenlaub | 359/462 |
| 4,971,425 | 11/1990 | Okabayashi et al. | 359/48 |
| 5,132,839 | 7/1992 | Travis | 359/462 |
| 5,264,964 | 11/1993 | Fairs | 359/465 |
| 5,315,377 | 5/1994 | Isono et al. | 348/51 |
| 5,349,419 | 9/1994 | Taguchi et al. | 355/22 |
| 5,410,346 | 4/1995 | Saneyoshi et al. | 348/116 |

FOREIGN PATENT DOCUMENTS

| 405147455 | 6/1993 | Japan | 359/13 |
| 2252175 | 7/1992 | United Kingdom | G02B 27/22 |

Primary Examiner—Cassandra Spyrou
Assistant Examiner—Audrey Chang
Attorney, Agent, or Firm—Lyon & Lyon LLP

[57] ABSTRACT

An on-board vehicle display arrangement of a computer graphics device and two video cameras for generating left-viewpoint image and right-viewpoint image of vehicle guiding information, an image synthesizer for synthesizing the left-viewpoint image and right-viewpoint image by alternately arranging their elements by pixel, and a stereoscopic display for separately displaying a left-viewpoint image and a right-viewpoint image of the synthesized image, which images are provided inside the vehicle to display a stereoscopic image with outside information taken through the video cameras, vehicle travel guiding information generated by the computer graphics device according to navigation data, presumed travelling information generated by the computer graphics device according to a prospective running condition estimated from the results of detection of current driving conditions of the vehicle.

3 Claims, 13 Drawing Sheets

INFORMATION DISPLAY DEVICE FOR VEHICLE

This application is a Continuation application Ser. No. 08/297,587 filed on Aug. 29, 1994, now abandoned.

BACKGROUND OF THE INVENTION

The present invention relates to an information display device for a vehicle, which device is capable of stereoscopically displaying an image containing information for guiding the vehicle or information of circumstances outside the vehicle.

Japanese Laid-open patent publication No. 63-211100 discloses such a conventional method that, when an image of the front crossing is displayed on a screen and a direction of turning left or right at the crossing thereof is indicated by an arrow to guide the vehicle, a pseudo three-dimensional image by means of two-dimensional perspective is used for giving a three-dimensional effect to the object of the image displayed on the screen.

Japanese Laid-open patent publication No. 64-83424 discloses a conventional display device for a vehicle, which device is capable of detecting a current running condition of the vehicle, estimating a future travelling course of the vehicle, preparing a pseudo three-dimensional image of the presumed course by applying a two-dimensional perspective method and by projecting through a projector the prepared image onto a screen provide on a portion of a front glass of the vehicle in such a way that the image may be superimposed on an actual scene ahead of the vehicle.

The problems involved in the above-mentioned conventional method and device are as follows:

The perspective image displaying method can not produce a sufficient three-dimensional image, e.g., of a scene ahead of the vehicle with due impression of distance or of guidance at the crossing with due impression of reality.

The device for projecting a pseudo three-dimensional (two-dimensional perspective) image of a presumed travelling state of the vehicle in the direction of the front glass can not allow an observer to see the image as if it is overlapped on the actual scene ahead of the vehicle with a due impression of distance and space.

SUMMARY OF THE INVENTION

In view of the foregoing, the present invention was made to provide an information display device for use in a vehicle, which device, in contrast to a pseudo three-dimensional image (by using a two-dimensional perspective), is capable of generating a left-viewpoint image (image for left eye) and right-viewpoint image (image for right eye) taken through video cameras or produced by computer graphics, synthesizing an image from the images for left and right eyes by alternately arranging their elements by pixel by using an image synthesizer and separately displaying the left-viewpoint image and the right-viewpoint image of the synthesized image, thereby allowing a driver to observe a stereo image with his left eye and right eye.

The present invention was also made to provide an information display device for use in a vehicle, which device is capable of further reflecting a left-viewpoint image and right-viewpoint image for stereoscopic vision by a reflecting plate toward a front glass, permitting a driver to observe a stereo image of information for the vehicle at a specified plane in the direction of the front glass.

DESCRIPTION OF THE PREFERRED EMBODIMENTS

Figure 1:
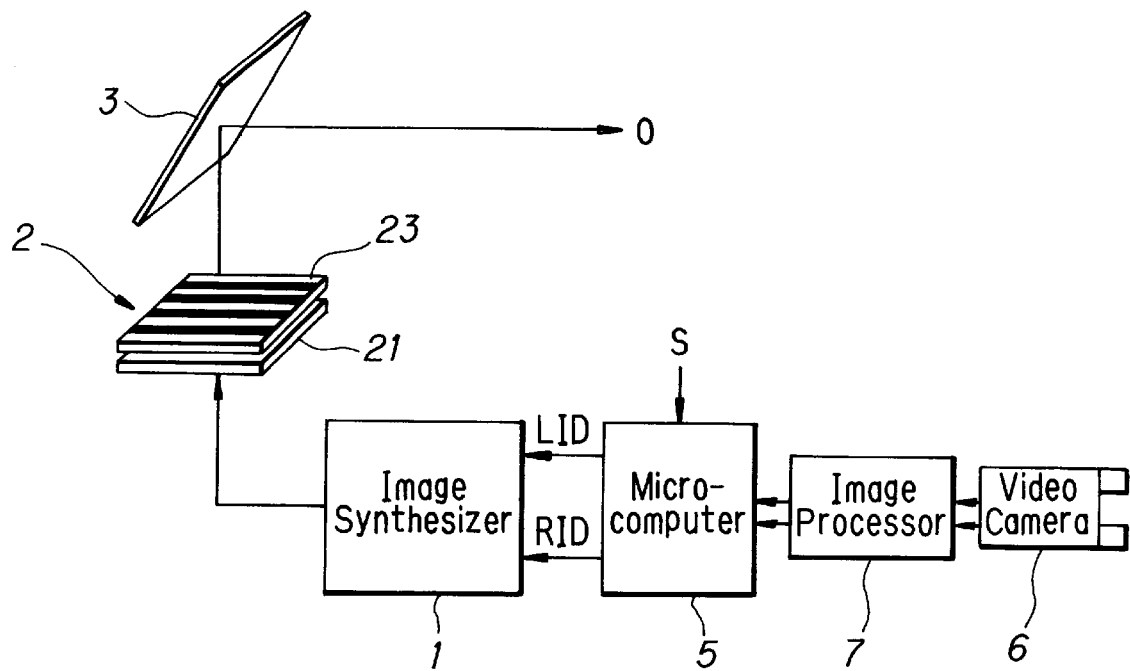
FIG. 1 is a block diagram showing a basic structure of an information display device for a vehicle, which is a first embodiment of the present invention.

Referring to FIG. 1, there is shown the first example of an information display device for use in a vehicle according to the present invention, which device basically comprises an image synthesizer 1 for receiving a left-viewpoint image data LID and a right-viewpoint image data RID and synthesizing a stereo image from the left-viewpoint image and the right-viewpoint image by alternately arranging linear sequences of pixels of the respective images in the same direction, a stereoscopic display 2 for displaying the synthesized image in such a way that the left-viewpoint image and the right-viewpoint image may be separately observed by the left eye and the right eye respectively, of an observer and a reflecting plate 3 for reflecting the stereoscopic image in a direction to a viewing position O of a crew of the vehicle.

Figure 2:
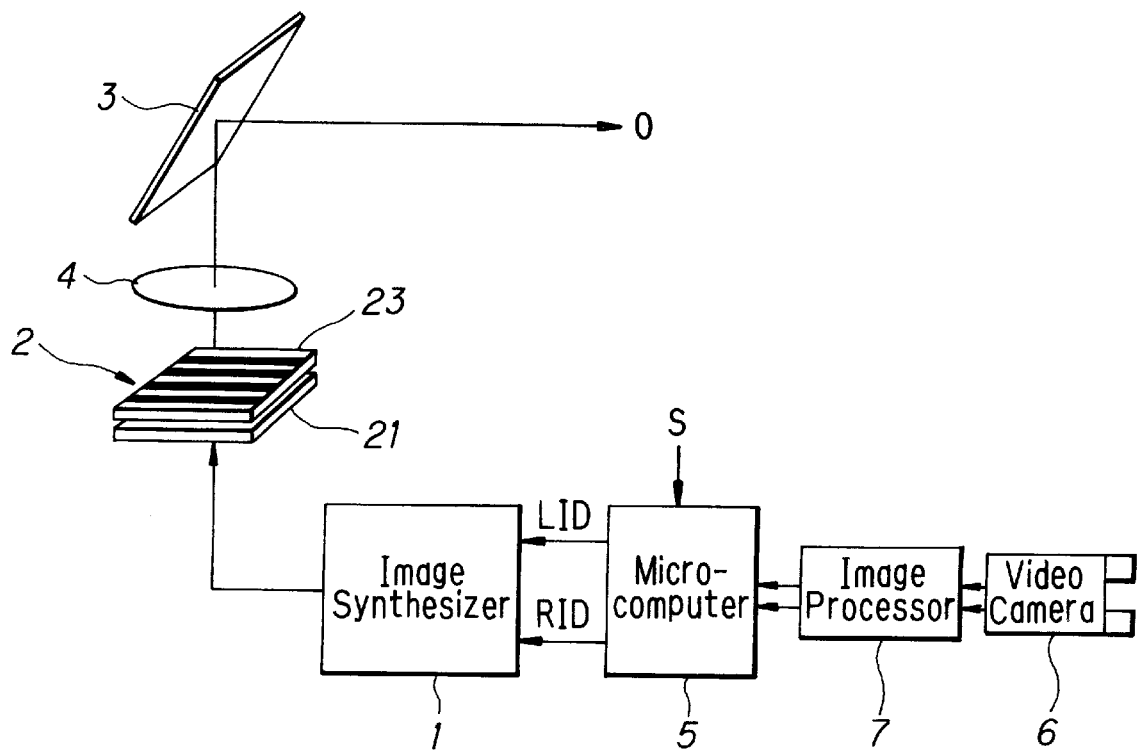
FIG. 2 is a block diagram showing another basic structure of the first embodiment of the present invention.

FIG. 2 is a block diagram showing another basic structure of the first embodiment of the present invention, wherein between the stereoscopic display 2 and the reflecting plate 3 is further provided a lens system 4 by which the stereoscopic image displayed by the display 2 is magnified by a specified magnification factor.

It is also possible to provide the lens system with a zooming function to be operated manually or according to a command signal from a microcomputer (not shown).

Figure 3:
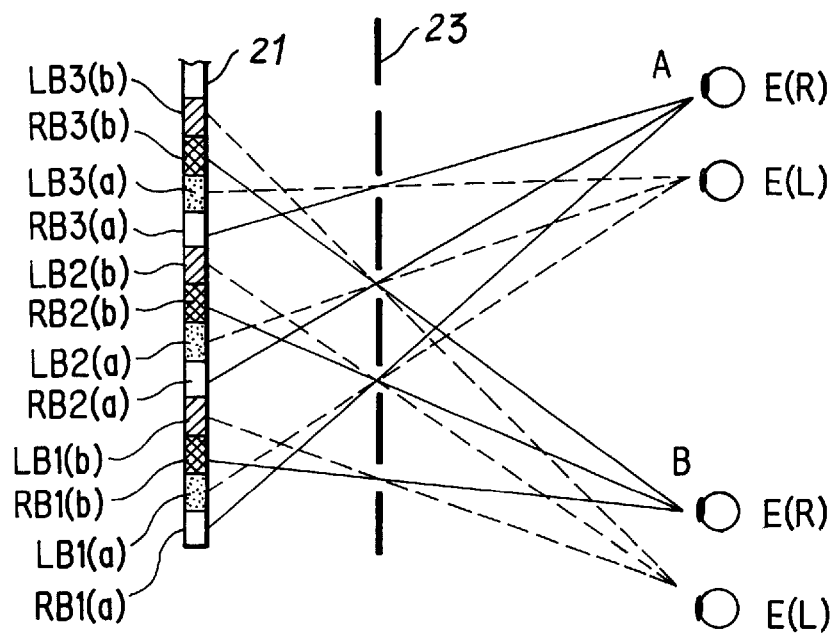
FIG. 3 shows a basic structure of a parallax barrier type stereoscopic display for multi-viewpoint vision.

The stereoscopic display 2 is a of parallax barrier type which, as shown in FIG. 3, comprises a liquid-crystal display provided at its front surface with a slit barrier 23 having slits that are each of a width corresponding to the width of a linear pixel sequence of a synthesized image displayed on the liquid-crystal display and whereby the synthesized image is divided into a left-viewpoint image and a right-viewpoint image, which are observed as a stereoscopic image.

The slit barrier 23 is of a striped image that is displayed as a barrier on the liquid crystal display so that slits may be formed in the barrier.

The liquid crystal display 21 displays a synthesized image in such a way that linear sequences of pixels LB1, LB2, LB3 . . . for a left-viewpoint image and linear sequences RB1, RB2, RB3 . . . for a right-viewpoint image are alternately arranged with each other.

When an observer views the image on the liquid crystal display 21 from a specified position through the barrier 23, his left eye looks only at linear sequences of pixels LB1, LB2, LB3 . . . of a left-viewpoint image and his right eye looks only at sequences RB1, RB2, RB3 . . . of pixels of a right-viewpoint image, thereby sensing a three-dimensional effect.

In the shown case, linear sequences LBn (a) (n=1, 2, 3, . . . ) of pixels in the left-viewpoint image and linear sequences RBn (a) of pixels in the right-viewpoint image for the driver seat and linear sequences LBn (b) pixels in the left-viewpoint image and linear sequences RBn (b) of pixels in the right-viewpoint image for an assistant seat are alternately arranged to form two respective stereoscopic images to be viewed by a person A with a left eye E(L) and a right eye E(R) on the driver's seat and a person B with a left eye E(L) and a right eye E(R) on the assistant seat respectively, as shown in FIG. 3.

Both persons A and B can observe the same stereoscopic images if two stereoscopic images for the driver seat and the assistant seat are synthesized from the same images respectively.

Both persons A and B can observe different stereoscopic images if the two stereoscopic images for the driver seat and the assistant seat are synthesized from different images respectively.

The device according to the present invention also includes means for detecting the vehicle in running state (not shown), which detection signal S is inputted into a microcomputer 5 which in turn clears off data on left-viewpoint and right-viewpoint images for the driver seat to realize that the stereoscopic image can not be viewed from the driver seat and can be viewed only from the assistant seat while the vehicle runs.

As mentioned above, the device according the present invention is featured by irrevocably eliminating the possibility of viewing the image from the driver seat while the vehicle moves by image processing to clear off the image itself instead of mechanically closing the image by a shield plate manually drawn-out.

The means for detecting the running state of the vehicle may be, for example, a speed sensor or a gear-shift-position sensor.

The device according to the present invention may make a stereoscopic image capable of being observed from a plurality of different viewing positions, thereby enabling the person A on the driver seat to observe the corresponding stereoscopic image even if his head is shifted to a different position out of the range of viewing the display screen.

It is also possible to cause the person A on the driver seat to view an image informing the person A of his head being out of the position suitable for driving the vehicle if it be so. On the contrary, it is also possible to make the person A unable to see any image if his head is out of the position suitable for driving the vehicle.

As left-viewpoint and right-viewpoint images of information for the vehicle, the invention uses two outside images taken through a two-tube video camera 6 (or a pair of video cameras disposed parallel to each other at a distance corresponding to a spacing between human eyes) mounted in the vehicle, which video camera is operated under the control of the microcomputer 5.

The data on left-viewpoint and right-viewpoint images taken through a two-tube video-camera enter into the image processing unit 7 whereby they are subjected to image processings such as contrast enhancement and edge enhancement and then the resultant (processed) data LID (for left-viewpoint image) and RID (for right-viewpoint image) are transferred to the microcomputer 5 and then from the microcomputer to the image synthesizer 1.

Data on images of the vehicle travel guidance and traffic information, which are generated by the computer graphics and stored in an image data memory of the microcomputer 5, are also used as left-viewpoint and right-viewpoint image data LID and RID.

The microcomputer 5 selectively outputs either of two kinds of image data LID and RLD—data taken by the video-camera 6 or data generated by the computer graphics—according to an instruction given from its control panel.

Figure 4:
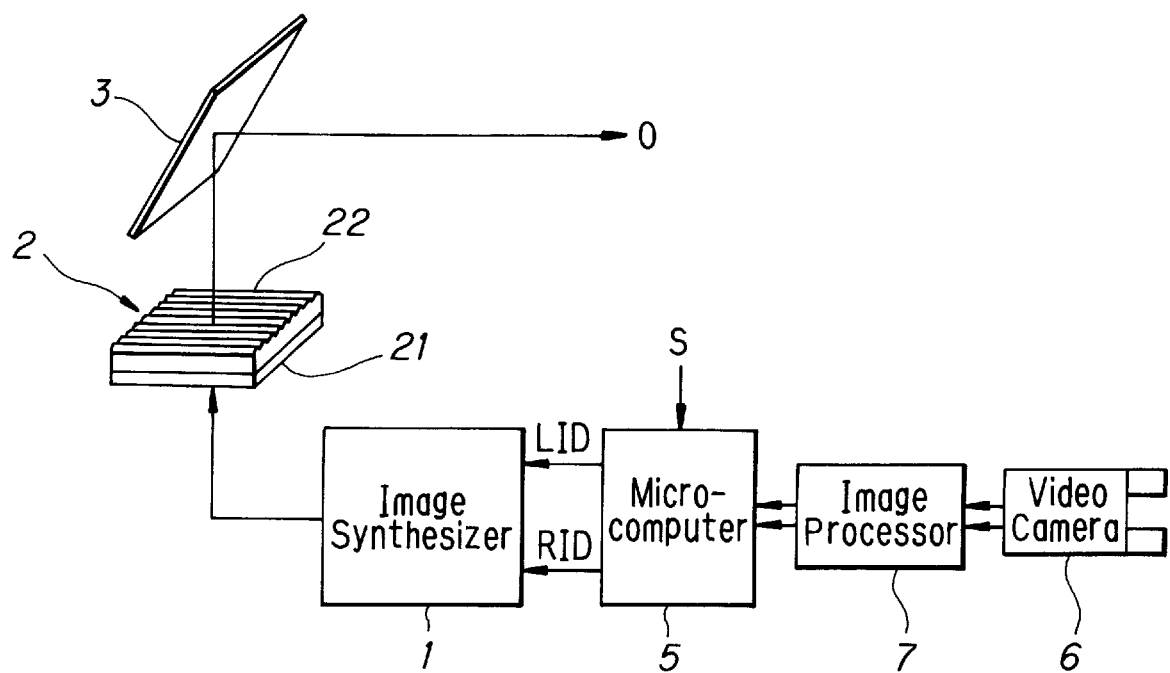
FIG. 4 is a block diagram showing a basic structure of an information display device for a vehicle, which device is a second embodiment of the present invention.
Figure 5:
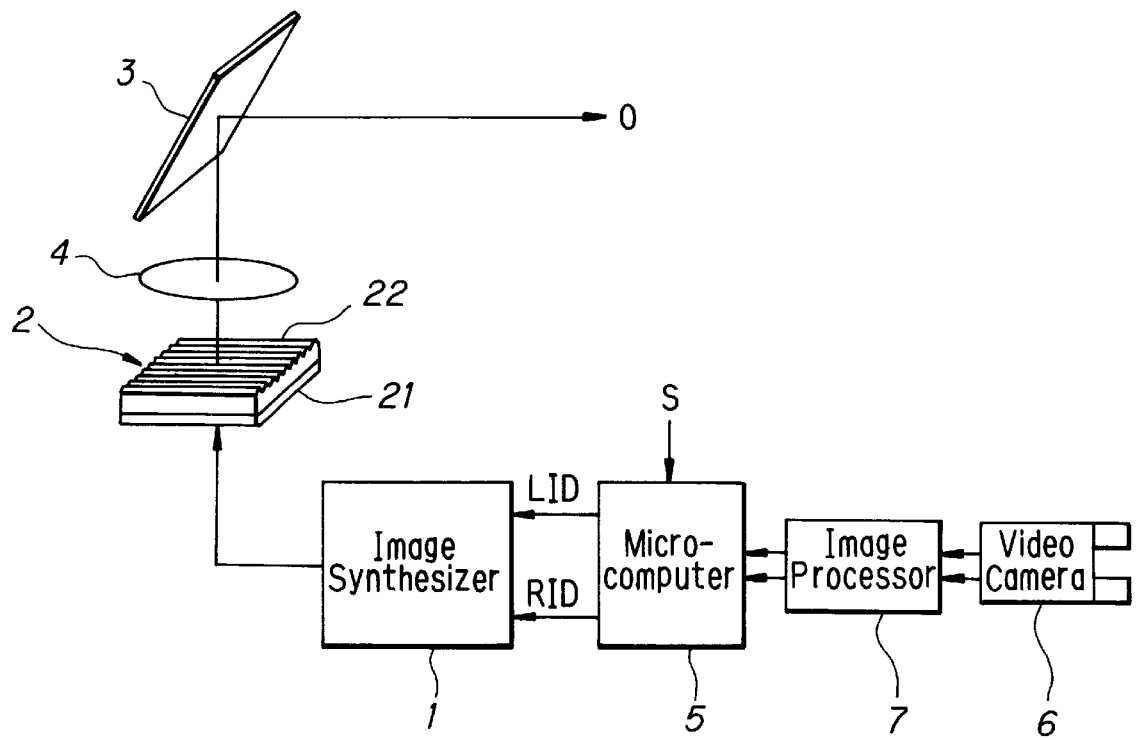
FIG. 5 is a block diagram showing another basic structure of the second embodiment of the present invention.
Figure 6:
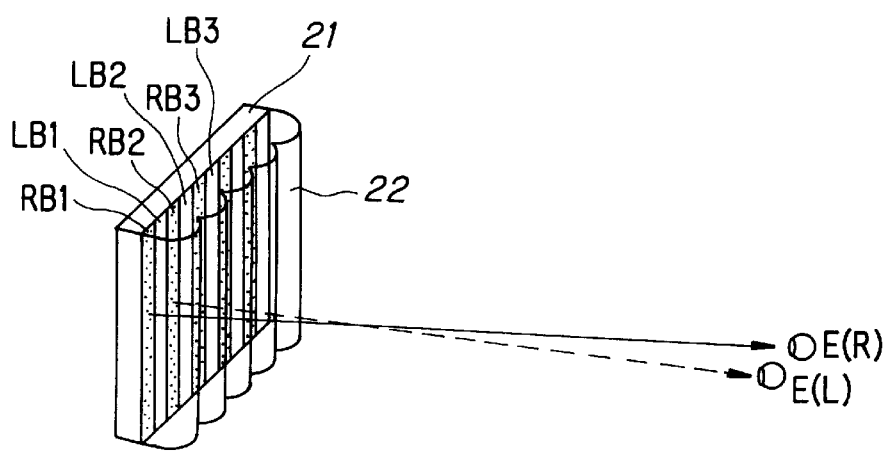
FIG. 6 is a perspective view showing a basic structure of a lenticular lens type stereoscopic display for binocular vision.
Figure 7:
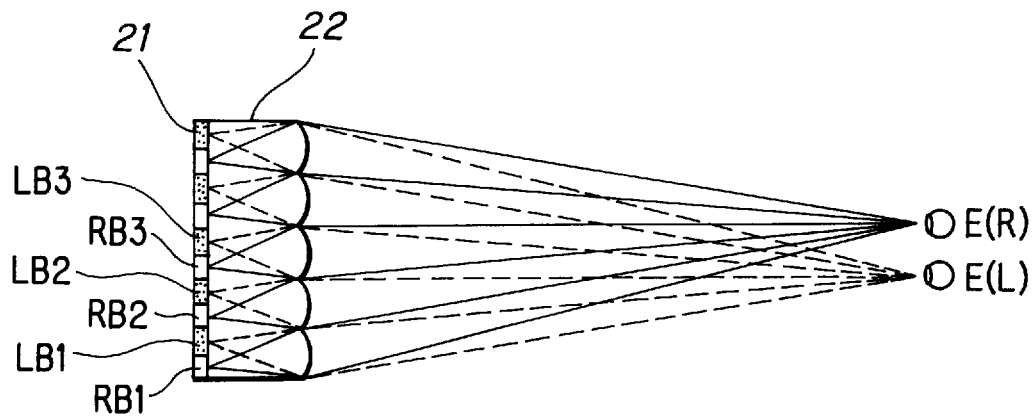
FIG. 7 is a plan view showing a basic structure of a lenticular lens type stereoscopic display for binocular vision.

Referring to FIGS. 4 and 5, there is shown a second embodiment of the present invention, wherein as a stereoscopic image display 2 is used a liquid crystal display 21 provided at its front surface with a lenticular portion 22 composed of a number of parallel-disposed lenses each with a concave surface as shown in FIGS. 6 and 7.

The liquid crystal display 21 can display an image synthesized from a left-viewpoint image and a right-viewpoint image by alternately arranging their linear pixels' sequences LB (LB1, LB2, LB3, . . . for the left-viewpoint image) and RB (RB1, RB2, RB3, . . . for the right-viewpoint image) at corresponding focal points of respective convex lenses of the lenticular portion 22.

Viewing the LC-display from a given position, one can distinguish by his left eye E(L) the linear pixels' sequence LB for left-viewpoint image only and by his right eye E(R) the linear pixels' sequence RB for right-viewpoint only to get the effect of a single stereoscopic image.

Figure 8:
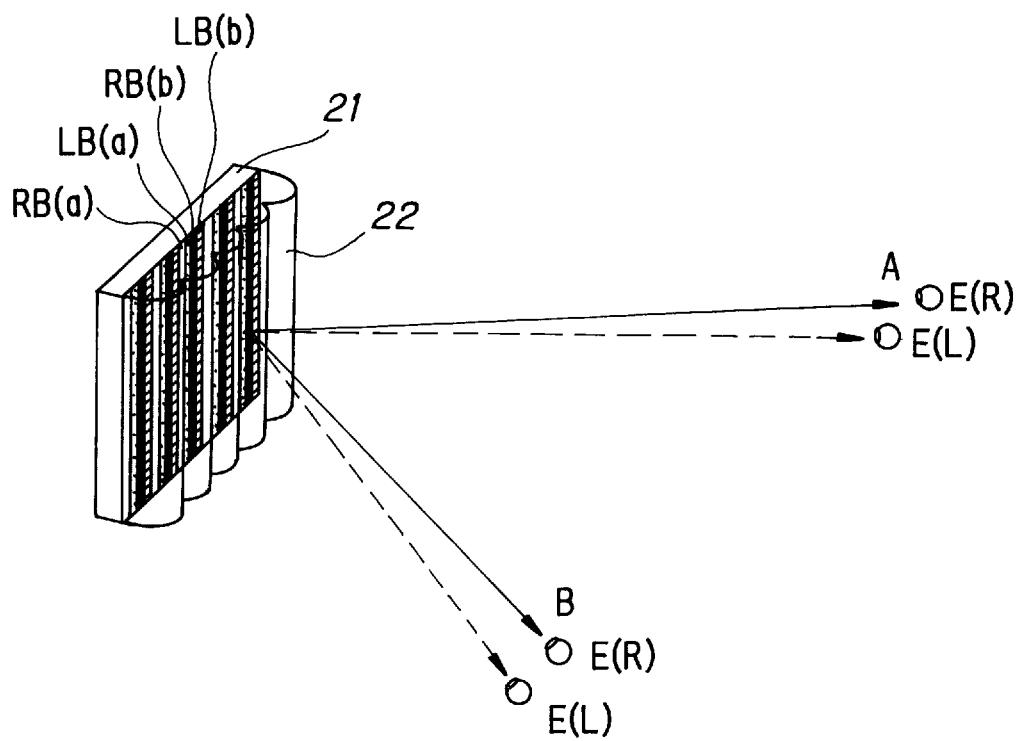
FIG. 8 is a perspective view showing a basic structure of a lenticular lens type stereoscopic display for multi-viewpoint vision.
Figure 9:
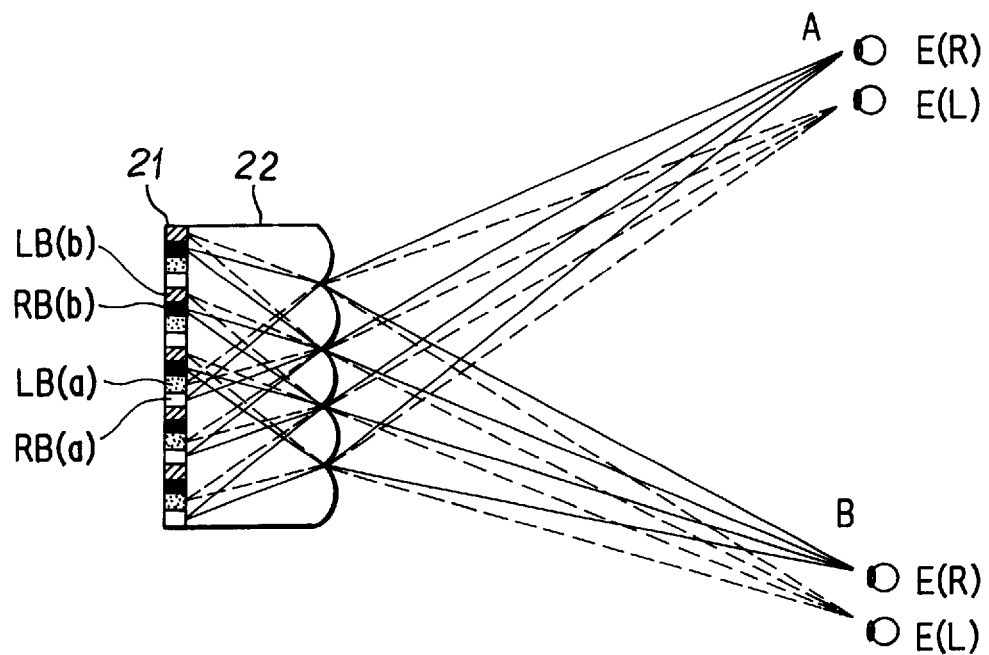
FIG. 9 is a plan view showing a basic structure of a lenticular lens type stereoscopic display for multi-viewpoint vision.

As shown in FIGS. 8 and 9, the liquid crystal display 21 is also capable of displaying two synthesized images for a driver seat and an assistant seat, each image being composed of a right-viewpoint image and a right-viewpoint image, by alternately arranging a pair of linear pixels' sequences LB(a) (for the left-viewpoint image) and RB(a) (for the right-viewpoint image) and a pair of linear pixels' sequences RL(b) (for the left-viewpoint image) and RB(b) (for the right-viewpoint image): one stereoscopic image is observable by person A with a left eye E(L) and a right eye E(R) in the driver seat and the other is observable by person B with a left eye E(L) and a eye E(R) in the assistant seat. It is also possible to separately control the stereoscopic image for the driver seat and the stereoscopic image for the assistant seat.

Figure 10:
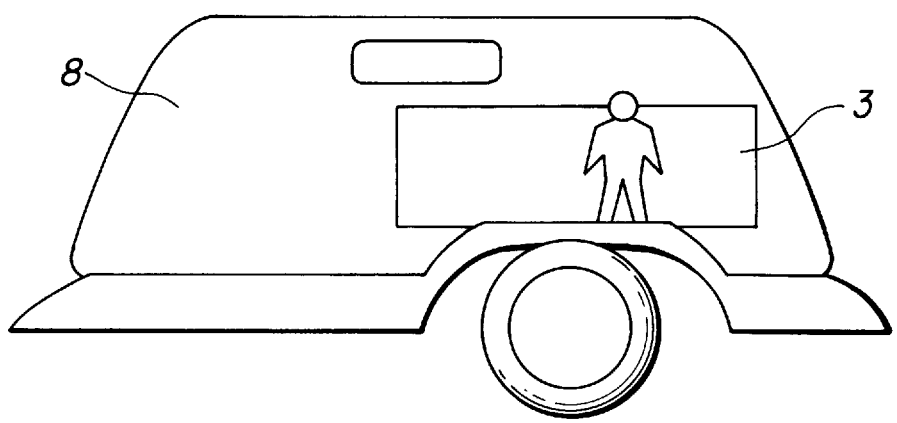
FIG. 10 is an elevation view showing an example of a stereoscopic image projected in the direction of the front glass of a vehicle.
Figure 11:
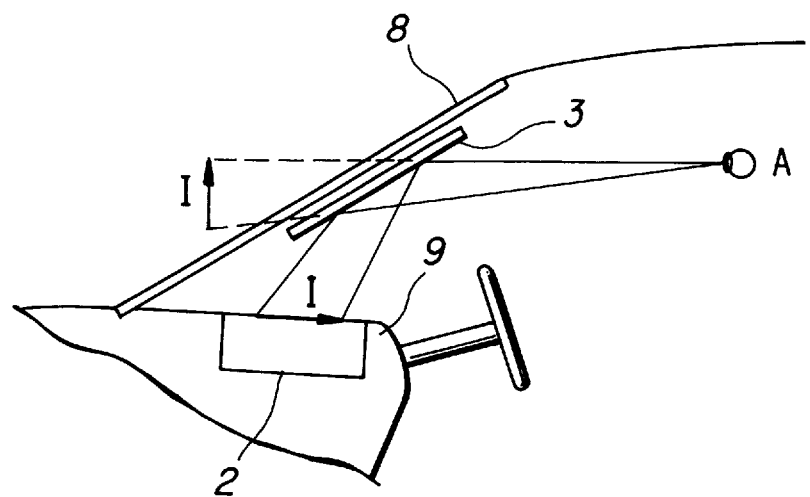
FIG. 11 is a side elevation view showing an example of an arrangement of a stereoscopic display and a reflecting mirror of a vehicle.

A reflecting plate 3 is disposed between the person A on the driver seat and a front glass 8 of the vehicle so that it may reflect the image from the stereoscopic display along the viewing direction of the person A to produce the projected image in the direction of the front glass 8 of the vehicle as shown in FIGS. 10 and 11.

Practically, the reflecting plate 3 is bonded to an inner surface of the front glass 8 or in a laminated portion of the front glass 8 if the glass is laminated.

The reflecting plate 3 may be a half-mirror or a light-transmitting optical-interference mirror that is manufactured by depositing an optical interference film on a transparent substrate (a front glass) to reflect only specific color light waves from the stereoscopic image display 2 and to transmit other light waves. This is essential not to obstruct the field of view of crew members, especially, the driver while driving the vehicle.

It is also possible to dispose a reflecting plate 3 of no light-transmission at such a place that does not obstruct the field of view of the driver when driving the vehicle.

FIG. 11 shows an example of an arrangement of a stereoscopic image display 2 and a reflecting plate 3. The display 2 is mounted in a dashboard portion 9 in such a way that its display screen is exposed upward. A stereoscopic image I displayed on the display screen is reflected at the reflecting plate 3 toward the driver's eyes. Accordingly, the driver A can view the stereoscopic image I at a plane in the direction of the front glass, which is symmetrical to the display screen about the reflecting plate.

In a thus constructed device, it is possible to take a scene ahead of the vehicle through a dark field two-tube video-camera when running at night or passing through a tunnel and project an obtained stereoscopic image in the direction of the front glass in such a way that it may be superimposed on the actual scene. This is useful to give the driver effective information concerning the road ahead of the vehicle at night and/or in a dark place.

In this case, the driver can look at the front scene image reflected in the front glass with the same stereoscopic vision as the actual scene, for example, he can distinguish an obstruction (human) on the road in front of the vehicle with a due sense of distance as shown in FIG. 10, and he can well recognize a stereoscopic image of other outside information such as a separate grade crossing, a slope and the like.

If the front scene image is projected as a simple two-dimensional image in the direction of the front glass, it does not match the actual scene the driver views, particularly in the sense of distance, and impairs the visibility of the view ahead of the vehicle.

It is also possible to project a stereoscopic image generated by the computer graphics for guidance of the vehicle onto the front glass in such a way so as to superimpose it with the actual scenery in front of the vehicle in the case when the microcomputer 5 is used as a main computer of a navigation device mounted on the vehicle, which determines current position of the vehicle on a road map according to GPS and at the same time indicates it on the road map displayed on a display screen. This makes it possible to conduct optimal guiding of the vehicle in accordance with the actual front scene.

Figure 12:
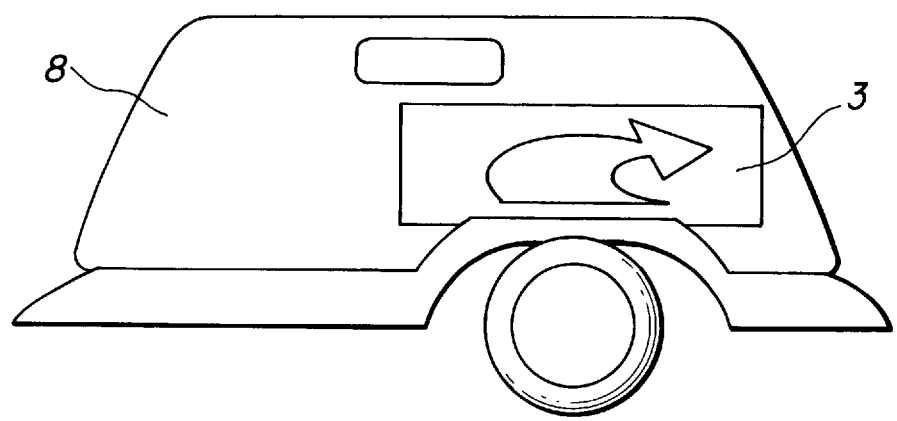
FIG. 12 is an elevation view showing another example of a stereoscopic image projected in the direction of the front glass of a vehicle.

For example, with such a navigation device that indicates by an arrow the turning direction (left or right) at a specified crossing on a predetermined course on the road map indicated on the display screen when the vehicle is approaching the specified crossing, it is possible to project a stereoscopic image of a turning instruction arrow on the front glass to be superimposed with the actual front scene of the crossing viewing from the driver's position as shown in FIG. 12.

According to the present invention, all information for the vehicle (guidance and outside conditions) can be represented as a stereoscopic image that the crew can recognize with enough stereoscopic vision and due sense of distance as matched with the actual outside scene. In this case, it is also possible to selectively observe the same image or different images from plural directions, e.g., from the driver seat and the assistant seat. Multi-display of different images observable at one time from different points of view is also possible. The stereoscopic image of information viewable from the driver seat can be cleared off by image processing if need be when the driver is driving the vehicle. Clearing off the image itself assures the field of the driver's view cleared of unnecessary information when he is driving the vehicle.

According to the present invention, the stereoscopic image of the scene ahead of the vehicle, which is taken through a two-tube video-camera, and a stereoscopic image for guiding the vehicle, which is generated by the computer graphics, can be reflected in the front glass and recognized by the crew with the same stereoscopic vision and sense of distance as the actual scene viewed through the front glass. This feature is effective to impressively give the information.

It is also possible to project a stereoscopic image of any video programs previously set in the microcomputer 5 on the front glass to enjoy such programs during parking time.

The information device according to the present invention is capable of displaying video information not only in three dimensions but also in usual two dimensions. In this case, a video image of information for the vehicle such as guidance for driving the vehicle and the surrounding conditions is synthesized by alternately arranging by pixel of two images, one is for viewing from the driver seat and the other for viewing from an assistant seat. The synthesized image is projected on a screen, which through a slit barrier or a lenticular lens disposed on the front surface thereof is divided into two images separately viewable in two dimensions one from the driver seat and the other from the assistant seat.

The two images may be the same images viewable from the driver seat and the assistant seat.

The two images may be different images viewable from the driver seat and the assistant seat.

It is possible to make the driver unable to view any image from his seat while driving the vehicle by automatically cancelling an image for the driver seat according to a signal detecting the vehicle being in a running state. In this case, it may be possible to display the image at a different place whereat the image may not affect the field of view of the driver.

Figure 13:
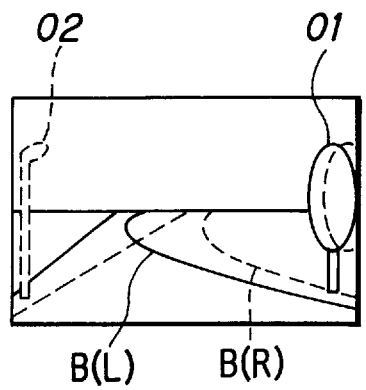
FIG. 13 shows an image synthesized from a left-viewpoint image and a right-viewpoint image taken through a video camera.

To view a stereoscopic image by using the above-mentioned information display device for a vehicle, it is necessary to cause the stereoscopic image display to display a synthesized image which, as shown for example in FIG. 13, is composed of two images having a parallax from each other—one is a left-viewpoint image B(L) shown by solid lines and the other is a right-viewpoint image B(R) shown by dotted lines in FIG. 13. When this synthesized image is displayed on the display screen, its edge portions at both edges of the screen may lose a part of the left-viewpoint or right-viewpoint image, resulting in lack of parallax of the two images at the edge portions.

In short, the synthesized image shown on the display screen includes an object O1 in its left-viewpoint image B(L) as shown at right edge portion of the screen (FIG. 14) but is lacking of a part of said object O1 in the right-viewpoint image (FIG. 15), which disappears out of the display screen due to the effect of parallax. On the contrary, another object O2 shown on the left edge of the display screen exists in the right-viewpoint image B(R) (FIG. 15) but is absent in the left-viewpoint image (BCL) (FIG. 14), which disappears out of the screen due to the effect of parallax.

Consequently, if the synthesized image is displayed on the display screen in such condition that its left-viewpoint image B(L) or right-viewpoint image B(R) is lacking of its edge portion, a viewable stereoscopic image becomes to be unnatural due to being partially lacking in parallax. Stereo vision of the image may tax the observer's eyes.

Therefore, the present invention includes a step to cause the microcomputer 5 to cut off a right-edge portion of the left-viewpoint image and a left-edge portion of the right-viewpoint image by a specified width corresponding to the parallax, i.e., to process the edge portions to be cleared of the image data (e.g., nulling the brightness) so that the synthesized stereoscopic image displayed on the display screen may not include in its both edge portions only a left-viewpoint image B(L) or right-viewpoint image B(R).

Figure 14:
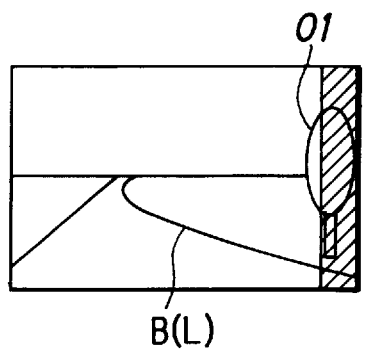
FIG. 14 shows a left-viewpoint image of the synthesized image shown in FIG. 13.
Figure 15:
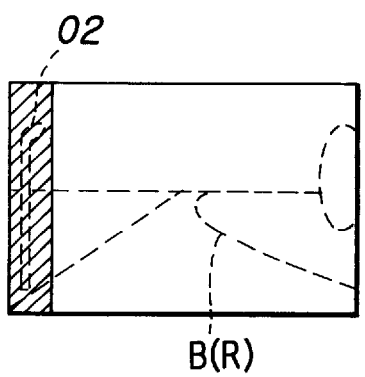
FIG. 15 shows a right-viewpoint image of the synthesized image shown in FIG. 13.
Figure 16:
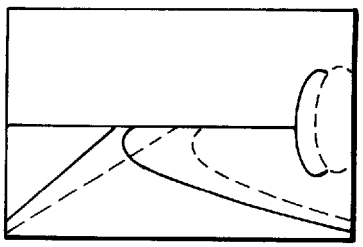
FIG. 16 shows an image synthesized of a left-viewpoint image having a cut-off right-edge portion and a right-viewpoint image having a cut-off left-edge portion.

The hatched right-edge portion of the image shown in FIG. 14 and the hatched left-edge portion of the image shown in FIG. 15 are the portions to be cut off. FIG. 16 shows an image synthesized from a left-viewpoint image processed to cut off the right-edge portion and a right-viewpoint image processed to cut off the left-edge portion.

Figure 17:
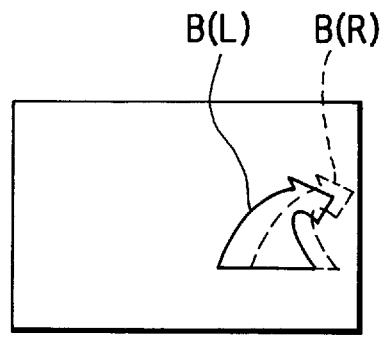
FIG. 17 shows an image synthesized from a left-viewpoint image and a right-viewpoint image by computer graphics.

Similar processing may be applied to a stereo image generated by computer graphics as shown in FIG. 17.

Figure 18:
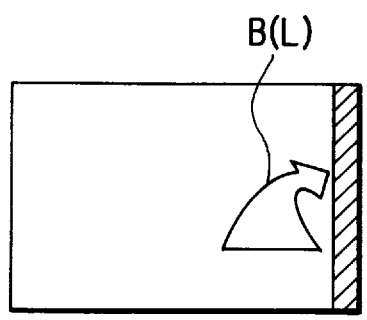
FIG. 18 shows a left-viewpoint image of the synthesized image shown in FIG. 17.
Figure 19:
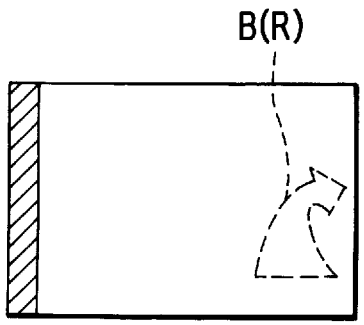
FIG. 19 shows a right-viewpoint image of the synthesized image shown in FIG. 17.

Stereo vision of a synthesized image of FIG. 17 can be obtained on the condition that pixels composing a left-viewpoint image B(L) indicated by solid lines and pixels composing a right-viewpoint image B(R) indicated by dotted lines exist in a relation of 1:1 in a stereoscopic image on a display screen. When a stereo image is displayed with the right-viewpoint image B(R) full at an edge of the display screen as shown in FIG. 19, the left-viewpoint image B(L) is displaced to the left correspondingly by a parallax as shown in FIG. 18. If an attempt is made to indicate anything on the hatched right-edge portion shown in FIG. 18, the right-viewpoint image B(R) portion corresponding to this portion goes out of the screen, spoiling stereoscopic vision.

Cutting-off widths of the right-edge portion and the left-edge portion of a stereo image (the left-viewpoint image and the right-viewpoint image) are determined according to the corresponding parallax values for the left-viewpoint image and the right-viewpoint image. Maximal width is about 65 mm that corresponds to a distance between left and right eyes. For a stereo image taken through a two-tube video camera, a parallax at a left-viewpoint image and a right-viewpoint image may differ depending on the distance between the video camera 6 and a camera subject.

Accordingly, the cutting-off widths of the right-edge portion (of the left-viewpoint image) and left-edge portion (of the right-viewpoint image) of the stereo image are predetermined as an optimal value not more than 65 mm. It also is be possible that the microcomputer 5 reads a stereo image (left-viewpoint image and right-viewpoint image), determines a displacement between the left-viewpoint image and right-viewpoint image at the right-edge portion and the left-edge portion of the stereo image, calculates parallax values according to the distances between the video camera 6 and subjects existing at the left-edge and at right-edge and then determines variable cutting-off values of respective edge portions according to the calculated values of parallax at the respective edge portions of the left-viewpoint image and the right-viewpoint image.

Figure 20:
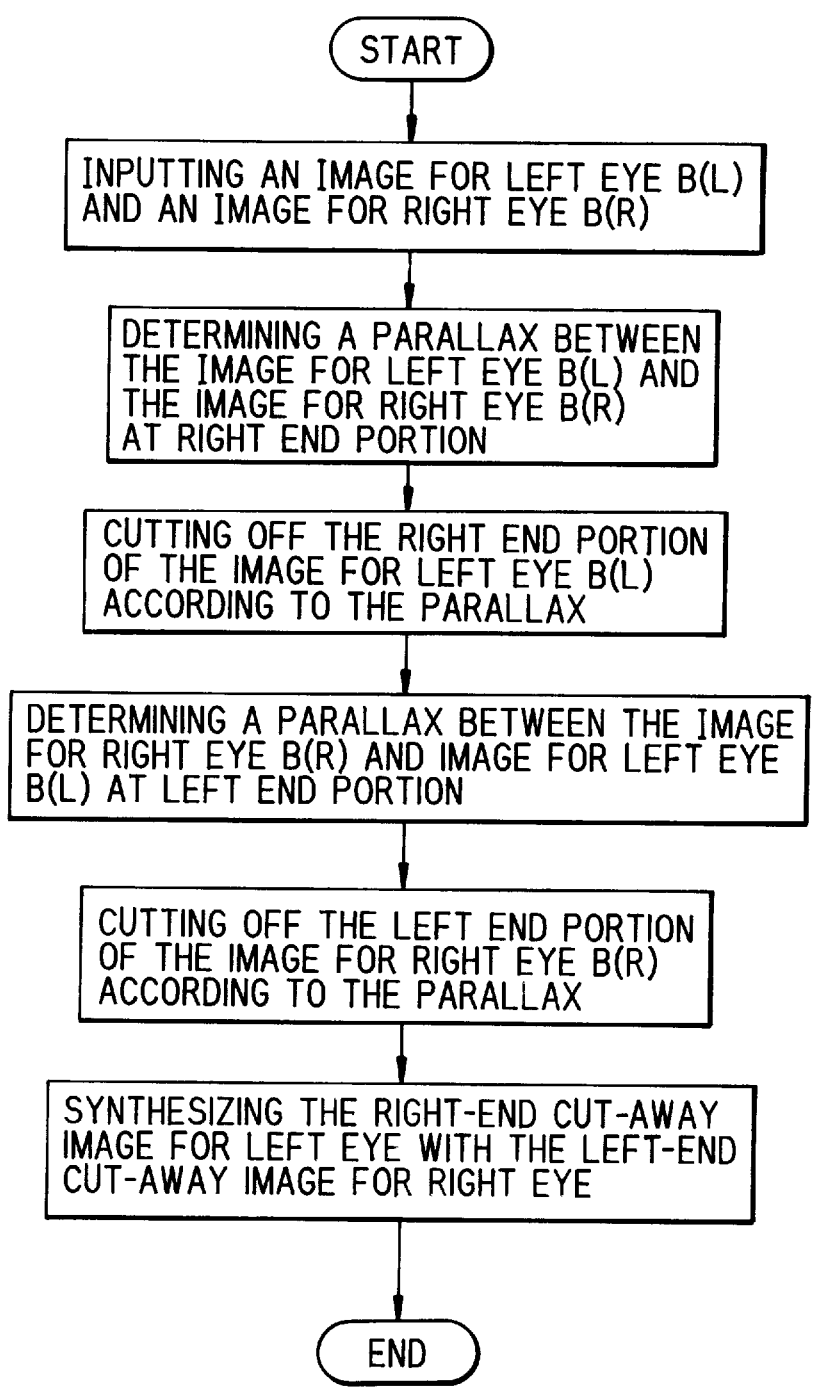
FIG. 20 is flow chart showing processing steps to cut off a right-edge portion of a left-viewpoint image and a left edge-portion of a right-viewpoint image respectively by a width corresponding to a parallax of both images.

FIG. 20 is a flow chart showing processing steps to cut off the edge portions of the stereo image. In the case when cutting-off values of the right-edge portion and the left-edge portion are previously fixed according to the parallax values of the left-viewpoint image and the right-viewpoint image, the second and fourth steps of "Determining A Parallax between . . . , etc. are omitted.

Although the flow chart of FIG. 20 describes that the right edge portion of the left-viewpoint image and the left-edge portion of the right-viewpoint image are processed to be cut-off and then both processed images are synthesized, it is also possible that the left-viewpoint image and the right-viewpoint image are first synthesized and then the right-edge portion of the left-viewpoint image and the left-edge portion of the right-viewpoint image in the synthesized image are then cut off by respective specified values.

According to the present invention, it is also possible to process the right-edge portion of the left-viewpoint image and the left-edge portion of the right-viewpoint image to be shaded off by respective widths corresponding parallax values thereat by means of brilliance modulation under the control of the micro-computer instead of the above-mentioned cutting-off processing.

For instance, the right-edge portion of the left-viewpoint image and the left-edge portion of the right-viewpoint image may be shaded off by modulating brilliance at a constant ratio by a specified width thereof or by stepwise decreasing brilliance to the edge of each edge portion.

The above-mentioned means for processing the right-edge portion of the left-viewpoint image and the left-edge portion of the right-viewpoint image by cutting-off or shading-off by the widths corresponding to the parallax values are suited to prevent the stereo image from lacking an edge portion of the left-viewpoint or right-viewpoint image when the synthesized stereoscopic image composed of the left-viewpoint image and the right-viewpoint image at a specified parallax is displayed as shifted to one side of the screen. In the other words, the above-mentioned means assure that the stereo image is always viewable in the natural optimal condition, preventing the possible impairment of the stereoscopic image when displayed on the display screen.

When a two-tube video-camera 6 (or two separate video-cameras) for taking a stereo image (or images for stereo vision) of a sight ahead of a vehicle is mounted at any place with a wide front view in the vehicle, it may not take a stereo-image giving a sufficient three-dimensional effect and a distinctive impression of distance in accordance with the actual front scene.

Therefore, the present invention proposes to mount the video camera 6 close to the driver seat or on the top of the dashboard in front of the driver seat to take a stereo image that gives a three-dimensional effect and sense of distance close enough to accord with the actual sight the driver sees with his eyes.

Figure 21:
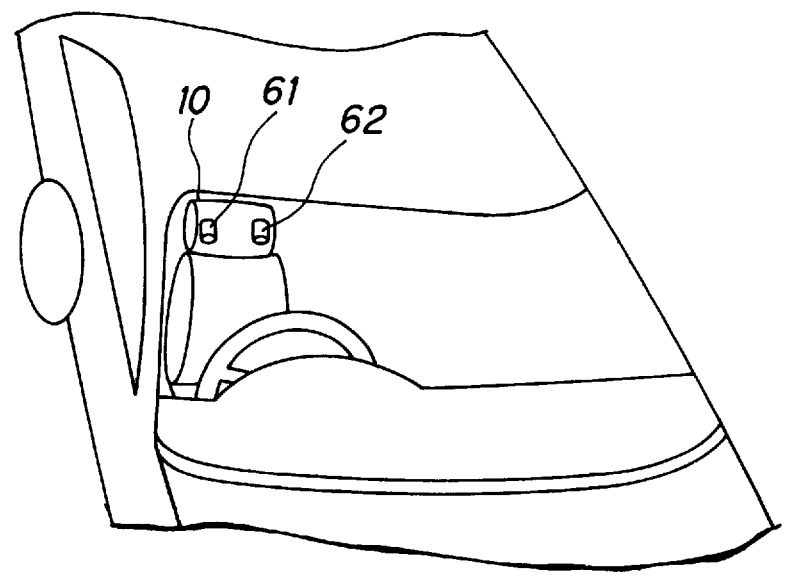
FIG. 21 is a perspective view showing a pair of video cameras mounted on a head rest portion of a driver seat.

For example, as shown in FIG. 21, a pair of video-cameras 61, 62 for attaining stereoscopic vision are disposed near the driver seat at positions close to the view points of the right and left eyes of the driver A (e.g., at both ends of head rest of the driver seat) to pick up an image of a sight ahead of the vehicle from view points near the driver's eyes.

Accordingly, it is possible to pick up a view ahead of the vehicle through a pair of dark field video-cameras 61, 62 when running at night or passing through a tunnel and to project an obtained stereo-image on the front glass in such a way that it may be superimposed on the actual scene. This is useful to give the driver effective information on the road ahead of the vehicle running at night and/or in a dark place.

In this case, the driver can see the front scene image reflected in the front glass with the same stereoscopic vision as the actual scene, for example, he can distinguish an obstruction (human) on the road ahead of the vehicle with due sense of distance as shown in FIG. 10, and he can well recognize in the stereoscopic vision the outside running condition such as a separate grade crossing, a slope and the like.

A pair of video cameras 61, 62 may be disposed on the top of the dashboard 11 in front of the driver seat to pick up a front sight from view points near the left and right eyes of a person A sitting on the driver seat.

Figure 22:
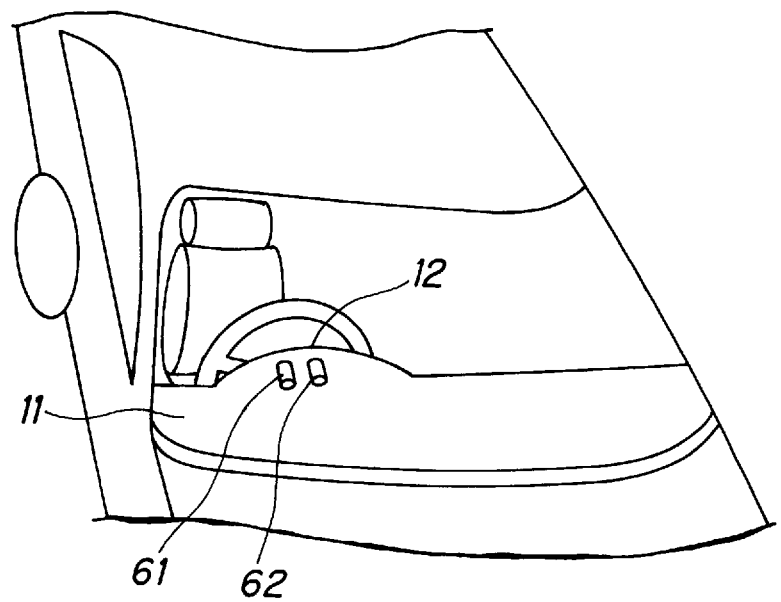
FIG. 22 is a perspective view showing a pair of video cameras mounted at a top center of a meter-cluster portion of a dashboard of a vehicle.
Figure 23:
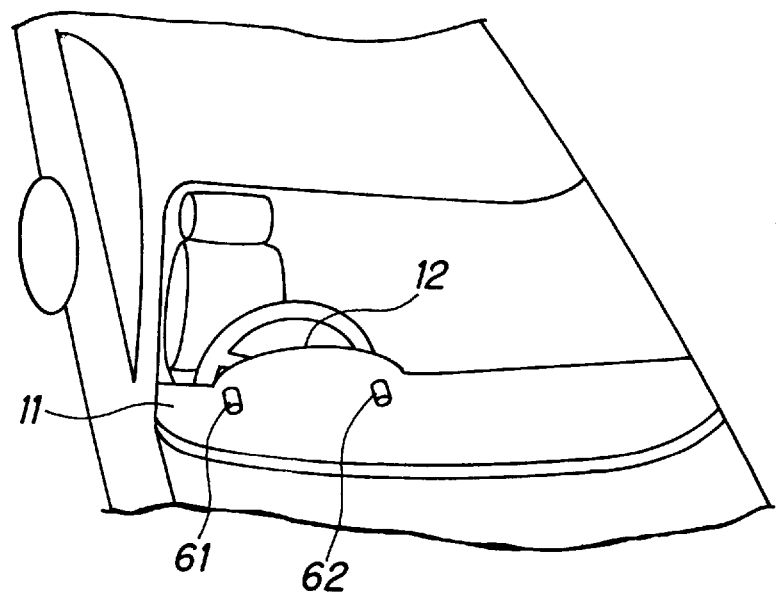
FIG. 23 is a perspective view showing a pair of video cameras mounted at opposite ends of a meter-cluster portion of a dashboard of a vehicle.
Figure 24:
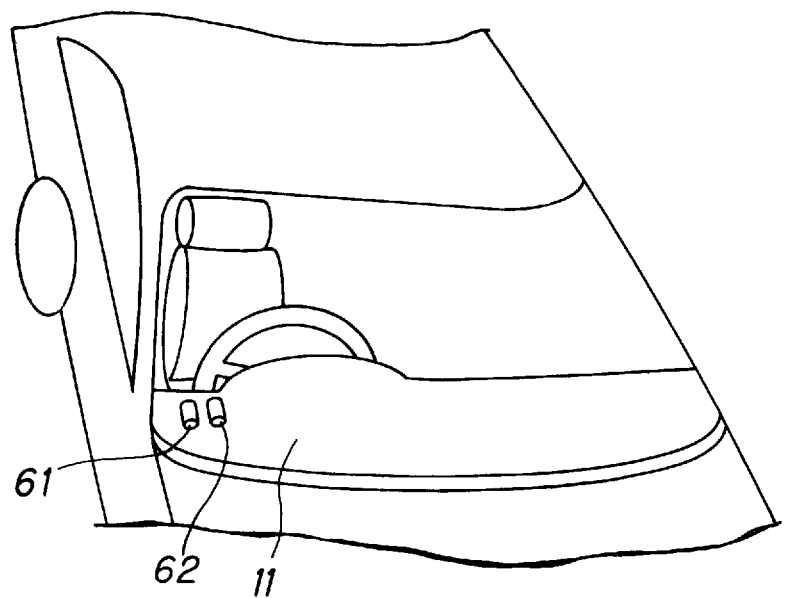
FIG. 24 is a perspective view showing a pair of video cameras mounted at an end portion of a dashboard in front of a driver seat of a vehicle.

For example, the paired video-cameras 61, 62 may be mounted at the center of a meter cluster portion 12 of the dashboard 11 as shown in FIG. 22. The paired video cameras 61, 62 may also be arranged at both sides of a meter cluster 12 of the dashboard 11 as shown in FIG. 23. The paired video-cameras 61, 62 may also disposed at a side end of a dashboard 11 in front of the driver seat as shown in FIG. 24.

Figure 25:
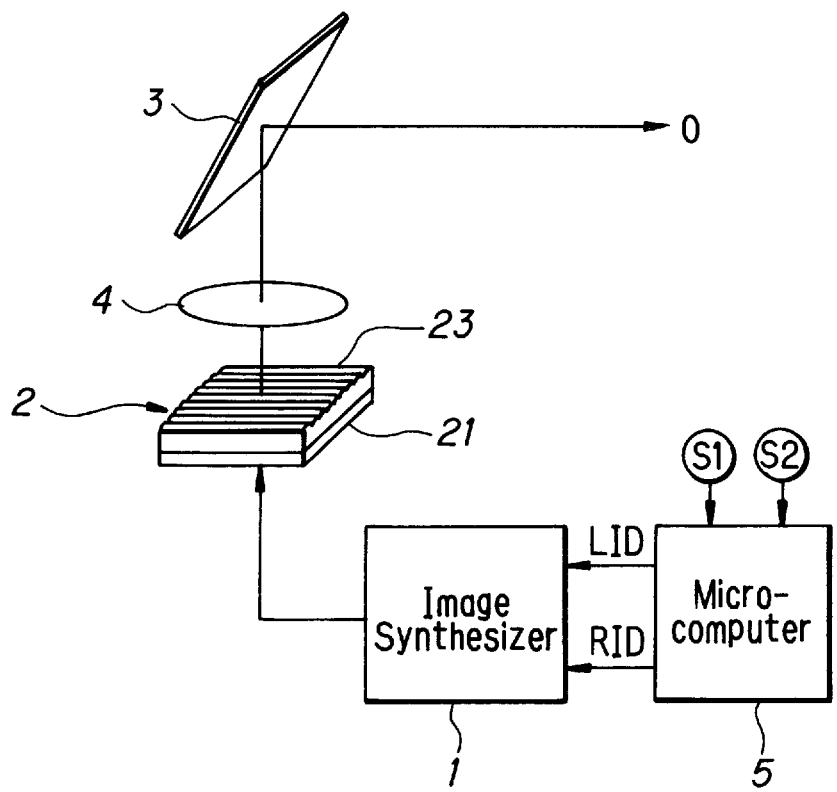
FIG. 25 is a block diagram showing a basic structure of an information display device for a vehicle, which device is a third embodiment of the present invention.

FIG. 25 shows the third embodiment of the present invention. In this embodiment, a microcomputer 5 reads signals from a speed sensor S1, a yaw rate sensor S2 and other sensors for sensing the current running conditions of the vehicle, estimates a prospective running state of the vehicle, generates a left-viewpoint image and a right-viewpoint image, which are composed of pixel sequences at a specified parallax, by means of computer on the basis of the estimated running state, and projects a stereo image of the estimated prospective running state of the vehicle in the direction of the front glass of the vehicle.

A case of the projection of a stereo-image of a prospective running course, by way of an example of a predictable running state of the vehicle, will be described as follows:

The microcomputer 5 reads signals from the speed sensor S1, the yaw rate sensor S2 and the other sensors for sensing current running conditions of a vehicle, detects the current running conditions of the vehicle and estimates a prospective running course (a locus generated by the center of the vehicle) of the vehicle on the basis of the detected results.

Estimation of a prospective running course of the vehicle is performed in the same way as a conventional method.

For example, a signal from the speed sensor S1 and a signal from the yaw rate sensor S2 are used for determining the vehicle running speed v and an angular velocity γ in the yaw direction respectively. A current turning radius R of the vehicle is determined according to equation (1) and a prospective running locus is estimated according to the determined turning radius R.

$$R = v/\gamma \tag{1}$$

In another way, a running speed v and lateral acceleration "a" acting on the vehicle body are detected, a current turning radius R of the vehicle is determined according to equation (2) and a prospective running locus is estimated according to the determined turning radius R.

$$R = v^2/a \tag{2}$$

Besides the steady-state prediction of the prospective running course by the use of parameters indicating the response of the vehicle's movement, the steering state may be considered, i.e., application of a model equation of response of yaw rate and lateral acceleration to steering state may achieve more accurate estimation of the prospective running course.

Figure 26:
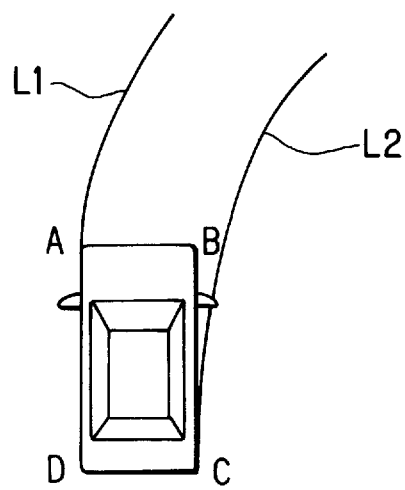
FIG. 26 is a plan view for showing a travelling state of a vehicle in view of a differential steering angle between inner wheels and outer wheels when changing a running direction of a vehicle.

Referring to FIG. 26, the microcomputer 5, considering a difference between turning radii of outer and inner wheels when the vehicle changes its running direction, determines a track L1 of the front left-end portion A or right-end portion B) whose point generates an outermost locus when turning to the right (or to the left) and a track L2 of the rear right-end portion C (or left-end portion D) whose point generates an innermost locus when turning to the right (or to the left) by calculation according to the previously registered characteristic data of the vehicle.

The microcomputer 5 generates a left-viewpoint image and a right-viewpoint image of the tracks L1 and L2 at a specified parallax for stereoscopic vision (FIG. 27) by computer graphics on the basis of the calculated tracks L1 and L2 and gives the image data LID and RID to an image synthesizer 2.

Figure 27:
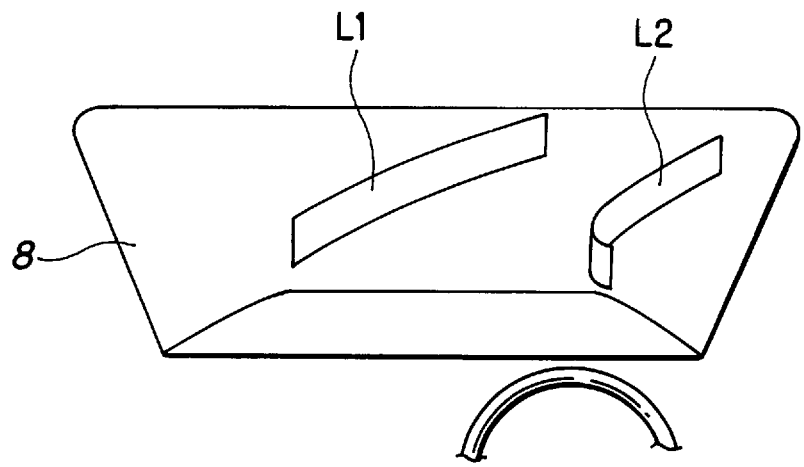
FIG. 27 is a view for showing a stereoscopic image of a presumed passing area for a vehicle, which is displayed in the direction of a front glass of the vehicle.

The stereo image of the prospective running state of the vehicle surrounded by tracks L1 and L2 is projected in the direction of the front glass to produce a stereoscopic image of the actual scene ahead of the vehicle as shown in FIG. 27.

Accordingly, the driver can view a stereo image of a prospective running state with a sufficient three-dimensional effect and impression of distance as superimposed on the actual scene ahead of the vehicle. This is very useful for a driver to accurately recognize the presumed passage and easily steer the vehicle for avoiding any possible obstruction when cornering at a low speed or parking the vehicle.

The image of tracks L1 and L2 is not limited to continuous wall-like tracks shown in FIG. 27, but it may be variously modified, for example, as discontinuous wall-like, linear, dotted line and so on.

Figure 28:
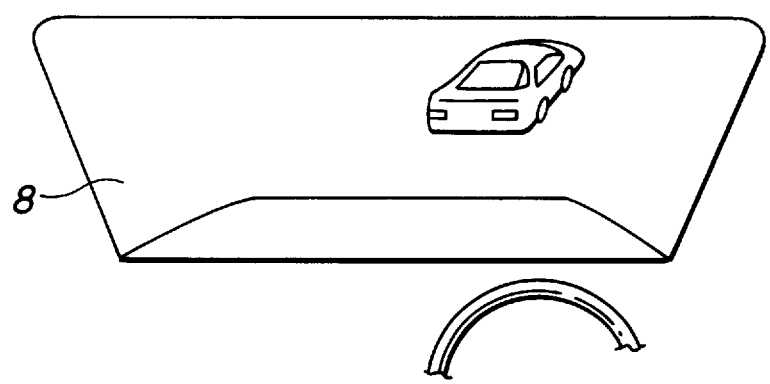
FIG. 28 is a view showing a stereoscopic image of a presumed travelling state of vehicle, which is displayed in the direction of a front glass of the vehicle.

FIG. 28 shows another example of an image of a prospective running state of the vehicle. In this case, the microcomputer 5 generates a left-viewpoint image and a right-viewpoint image of the running state of the vehicle in a presumed position that the vehicle will arrive at after a specified time (e.g., 3 seconds) by the computer graphics according to the running course estimated by the abovementioned method. The generated stereo image is then projected in the direction of the front glass in such a way that it may be observed in three-dimensions as superimposed on an actual scene ahead of the vehicle.

According to the present invention, it is possible to project a stereo image of a presumed running state generated according to the estimated running conditions in the direction of the front glass to produce the stereoscopic image superimposed on an actual scene ahead of the vehicle, giving sufficient three-dimensional effect and distinctive impression of distance. This stereoscopic image may assist the driver to accurately recognize the presumed passable range of the vehicle and to easily steer for avoiding the possible obstruction.

What is claimed is:

1. In a ground vehicle of the type controlled by a driver steering the vehicle on a roadway, the improvement comprising:

an information display device in the ground vehicle, comprising:

means for generating a left-viewpoint image and a right-viewpoint image of information for the ground vehicle with the information including an outside image taken through a pair of video cameras from the ground vehicle;

means for synthesizing an image from left- and right-viewpoint images by alternately arranging their elements;

a stereoscopic display for separately displaying the left-viewpoint image and the right-viewpoint image of the synthesized image for producing a stereoscopic image of information for the vehicle;

blanking means for clearing off each of the left-viewpoint and right-viewpoint images for the driver's seat; and a vehicle movement detector for detecting whether the vehicle is moving, the detector linked to the blanking means and actuating the blanking means when the vehicle is moving.

2. In a ground vehicle having movement controlled by a vehicle operator, the improvement comprising:

an information display device for use with the ground vehicle, comprising:

means for generating a left-viewpoint image and a right-viewpoint image of information for the ground vehicle, the information including an image generated by computer graphics on the basis of navigation information, for guiding movement of the ground vehicle;

means for synthesizing an image from left- and right-viewpoint images by alternately arranging their elements;

a stereoscopic display for separately displaying the left-viewpoint image and the right-viewpoint image of the synthesized image to produce a stereoscopic image of the information for the ground vehicle;

blanking means for clearing off each of the left-viewpoint and right-viewpoint images for the driver's seat; and a vehicle movement detector for detecting whether the vehicle is moving, the detector linked to the blanking means and actuating the blanking means when the vehicle is moving.

3. In a ground vehicle controlled by a vehicle operator, the improvement comprising:

means for generating a left-viewpoint image and a right-viewpoint image of information for the vehicle, the information including an image generated by computer graphics of a prospective vehicle travelling state on the ground that is estimated at least in part on the basis of a detected position, velocity, or acceleration of the ground vehicle;

means for synthesizing an image form left- and right-viewpoint images by alternately arranging their elements by pixel;

a stereoscopic display for separately displaying the left-viewpoint image and the right-viewpoint image of the synthesized image for producing a stereoscopic image of the information for the vehicle;

blanking means for clearing off each of the left-viewpoint and right-viewpoint images for the driver's seat; and a vehicle movement detector for detecting whether the vehicle is moving, the detector linked to the blanking means and actuating the blanking means when the vehicle is moving.

* * * * *